United States Patent
Kozminske (10) Patent No.: US 9,630,758 B2
(45) Date of Patent: Apr. 25, 2017

(54) REUSABLE TIE STRAP WITH MULTIPLE APERTURES

(71) Applicant: Gary Louis Kozminske, Mattawan, MI (US)

(72) Inventor: Gary Louis Kozminske, Mattawan, MI (US)

(73) Assignee: Dera Industries, LLC, Ann Arbor, MI (US)

( * ) Notice: Subject to any disclaimer, the term of this patent is extended or adjusted under 35 U.S.C. 154(b) by 0 days.

(21) Appl. No.: 14/833,095

(22) Filed: Aug. 23, 2015

(65) Prior Publication Data

US 2017/0050786 A1 Feb. 23, 2017

(51) Int. Cl.
*B65D 63/10* (2006.01)

(52) U.S. Cl.
CPC .... *B65D 63/1027* (2013.01); *B65D 2563/101* (2013.01); *B65D 2563/103* (2013.01); *B65D 2563/107* (2013.01)

(58) Field of Classification Search
CPC .......... B65D 63/1027; B65D 2563/103; B65D 2563/107; B65D 2563/101; B65D 63/10; B65D 63/1018; B65D 2563/10; Y10T 24/1498; Y10T 24/141
See application file for complete search history.

(56) References Cited

U.S. PATENT DOCUMENTS 4,077,562 A * 3/1978 Ballin ................ B65D 63/10
24/16 PB
2013/0333163 A1* 12/2013 Chen ................ B65D 63/1081
24/16 PB

FOREIGN PATENT DOCUMENTS

DE 2618546 A1 * 11/1977 ............ B65D 33/14
FR 1288128 A * 3/1962 ......... B65D 63/1027

* cited by examiner

*Primary Examiner* — Abigail Morrell
(74) *Attorney, Agent, or Firm* — Erik Vaclav Chmelar (57) ABSTRACT

An elongated tie strap comprising a head having a plurality of similarly dimensioned through-holes, a body having a plurality of axially oriented ridges on opposite lateral surfaces, and a tail having a thickness less than that of the body. The cross-sectional dimensions of the body are substantially equal to the cross-sectional dimensions of the through-holes, and the distance between adjacent ridges is substantially equal to the through-hole depth, such that the body may couple to the head when inserted through one or more through-holes.

4 Claims, 10 Drawing Sheets

REUSABLE TIE STRAP WITH MULTIPLE APERTURES

BACKGROUND OF THE INVENTION

The present invention relates generally to self-coupling strapping devices that may be referred to as tie straps, cable ties, zip ties, tie wraps, wire ties, and so on, whose many uses may include securing objects in place, bundling objects together, and tying bags closed. Tie straps generally comprise an elongated flexible strap extending from a stout retaining head. Disposed on the strap are usually a plurality of axially oriented ridges adapted to couple with a head retaining mechanism (e.g. retainer). Common retainers include a slot through which the strap may be inserted or a pawl under which the strap may be disposed.

Many variations exist, for example flat straps with raised or depressed ridges on one or more surfaces, small-diameter string-like straps on which multiple separated large-diameter cylinders or spheres are disposed, elastomeric (compressible) straps and retainers, and so on. Defining physical attributes of tie straps are: (1) a strap comprising a plurality of alternating regions of large and small cross-sectional areas, e.g. major and/or minor dimensions for a polygonal cross section such as a rectangle; and (2) a retainer that couples with one or more large- or small-dimension strap regions.

Correspondingly, there are many strapping devices that are not considered tie straps, such as: (1) ratchet straps and tie downs whose strap cross-sectional dimensions are substantially uniform along the longitudinal axis and whose retainer couples with such uniform strap primarily via friction, compression, or wrapping; (2) power-cord wraps and fasteners whose strap and retainer include complementary hook-and-loop regions (e.g. Velcro); and (3) power-cord wraps and fasteners whose strap includes one or more keyholes and whose retainer includes one or more buttons (or vice versa).

Single-use tie straps have existed for over a century, for example U.S. Pat. No. 588,848, entitled "Bag-fastener," and more recently U.S. Pat. No. 2,979,794, entitled "Wire or Cable Bundle Tie." Although such tie straps are useful for many applications, there is a need for reusable tie straps and for tie straps that may be arbitrarily tightened and loosened. Consequently, multiple-use tie straps with releasable retainers have been developed, for example U.S. Pat. No. 4,991,265, entitled "Cord Tie Device" and U.S. Pat. No. 5,193,250, entitled "Releasable Cable Tie." Advancements in elastomeric materials broadened the mechanisms by which straps and retainers could readily couple and decouple with each other, for example U.S. Pat. Nos. 7,866,005 and 8,276,244, both entitled "Elastomeric Releasable Cable Tie," and U.S. Pat. No. 9,021,665, entitled "Elastic Zip Tie."

Tie-strap reusability is a salient attribute of many prior arts and of the present invention. However, the present invention solves a critical need whose solution has not yet been taught: that a single tie strap may simultaneously achieve semi-permanent and reusable strapping. "Strapping" is coupling of a strap with a retainer; "reusable strapping" is strapping that is readily coupled and decoupled; and "semi-permanent strapping" is strapping that may or may not be readily coupled or decoupled. Simultaneous reusable and semi-permanent strapping allows a tie strap to be semi-permanently strapped to a first object (or objects), for example a stationary post, while a second second object (or objects) may be reusably strapped thereto, for example the handle of a broom. In the immediate example, the tie strap may be strapped to the post for an extended duration while the broom may be repeatedly strapped thereto while not in use. Similarly, such a tie strap may be used to strap an object to itself. For example, a tie strap may be semi-permanently strapped to an end of the a power cord and reusably strapped around additional loops of the cord when stowed.

U.S. Pat. No. 6,317,933, entitled "Binding Band" and U.S. Pat. No. 6,588,074, entitled "Self-mating Reclosable Binding Strap and Fastener" teach a slotted retainer adapted to receive a strap for securement to a first object and a hook-and-loop (or hook-and-hook) fastener for securement to a second (or same) object. However, a primary disadvantage of hook-and-loop fasteners is the loss of fastening strength due to soiling or wear. Furthermore, U.S. Pat. No. 6,523,229, entitled "Cord Keeper Strap" teaches a strap with keyholes and a retainer comprising a slot to receive the strap for securement to a first object and a button to receive the strap for securement to a second (or same) object. However, primary disadvantages of button-and-keyhole fasteners include fracturing of the strap adjacent to a keyhole, unreliable coupling between button and keyhole, and long distances between adjacent keyholes that yields coarse adjustment steps.

BRIEF SUMMARY OF THE INVENTION

The present invention overcomes prior-art limitations as well as provides additional advantages heretofore unavailable, as described an illustrated herein. This is most notably achieved by means of a plurality of retaining apertures in the head, each adapted to receive and couple with a ridged strap. A strap may be inserted through a first aperture for strapping to a first object (or objects), and the same or a second strap may be inserted through a second aperture for strapping to a second object (or objects, or again to the first object).

U.S. Pat. No. 9,021,665, entitled "Elastic Zip Tie" teaches a foam rubber tie strap comprising a strap with a plurality of jaws (i.e. bendable ridges) and only a single retaining aperture. The second (or third, fourth, etc.) aperture of the present invention is a non-obvious attribute that provides advantages impossible to achieve via '665, including: (1) simultaneous semi-permanent and reusable strapping; (2) chaining of multiple tie straps together to create a longer tie strap; and (3) double-retaining a strap for extra holding strength and reliability.

Furthermore, '665 teaches a tie strap that is "integrally molded from foam rubber, so that the elastic zip tie is an elastomeric product" (claims 1 and 9) and has an objective to be "stretchable, twistable . . . pliable, compressible, and springy," (column 2 line 64 through column 3 line 1), thereby requiring the head thickness to be "substantially larger than the longitudinal length of the holding space" [between adjacent jaws] (claims 1 and 9) so as to achieve adequate coupling. It teaches a suggested size ratio of at least 1.15 times (column 6 line 16, column 7 line 14, and claims 7 and 15). In contrast, the present invention teaches a tie strap without such notable 'springiness,' therefore the distance between adjacent ridges is defined to be substantially equal to the head thickness rather than substantially greater.

Finally, '665 teaches a strap with "bendable and elastically restorable flexible jaws" (i.e. bendable ridges; claims 1 and 9) that bend at the base while inside the aperture and stand erect while outside the aperture to secure the strap therein (FIG. 4C). In contrast, the present invention teaches a tie strap whose ridges do not bend at the base. Thus, ridges of the present invention are functionally distinct from those of '665, and consequently, the strap/retainer engaging mechanism of the present invention is substantially different than that of '665.

In addition to the three structural differences between the tie strap taught in '665 and the present invention: (1) single retaining aperture versus a plurality; (2) head thickness substantially greater than the distance between adjacent ridges versus substantially equal; and (3) ridges that bend at the base versus ridges that always stand erect; there are also significant differences in material composition. The tie strap of '665 is "an elastomeric product integrally molded from foam rubber to have a plurality of micropores," (column 4 line 58), in which "The larger the size of the micropores . . . and the wider the micropore-size distribution, the better the stretchability of the foam rubber," (column 4 line 64). Both independent claims of '665 restrict the tie strap to be "integrally molded from foam rubber," (claims 1 and 7). In contrast, the present invention is not necessarily composed of a microporous material such as foamed or expanded rubber, rather it may be composed of a thermoplastic elastomer (TPE) such as ethylene propylene diene monomer (EPDM) rubber with a high cross-link density. Such cross-linked material is structurally and behaviorally distinct from foamed rubber; an example material is Sarlink® 4165, manufactured by Teknor Apex Company.

Therefore, it is believed the present invention teaches a novel and non-obvious apparatus to achieve one or more useful outcomes never before taught in the prior art.

DETAILED DESCRIPTION OF THE INVENTION

Terms "head" and "first region" are synonymous; "body" and "second region" are synonymous; and "tail" and "third region" are synonymous. Furthermore, in the appropriate context, "ridge," "rib," "jaw," "tooth," and related terms are synonymous, as are "slot," "aperture," "hole," "throughhole," "bore," and related terms.

Figure 1:
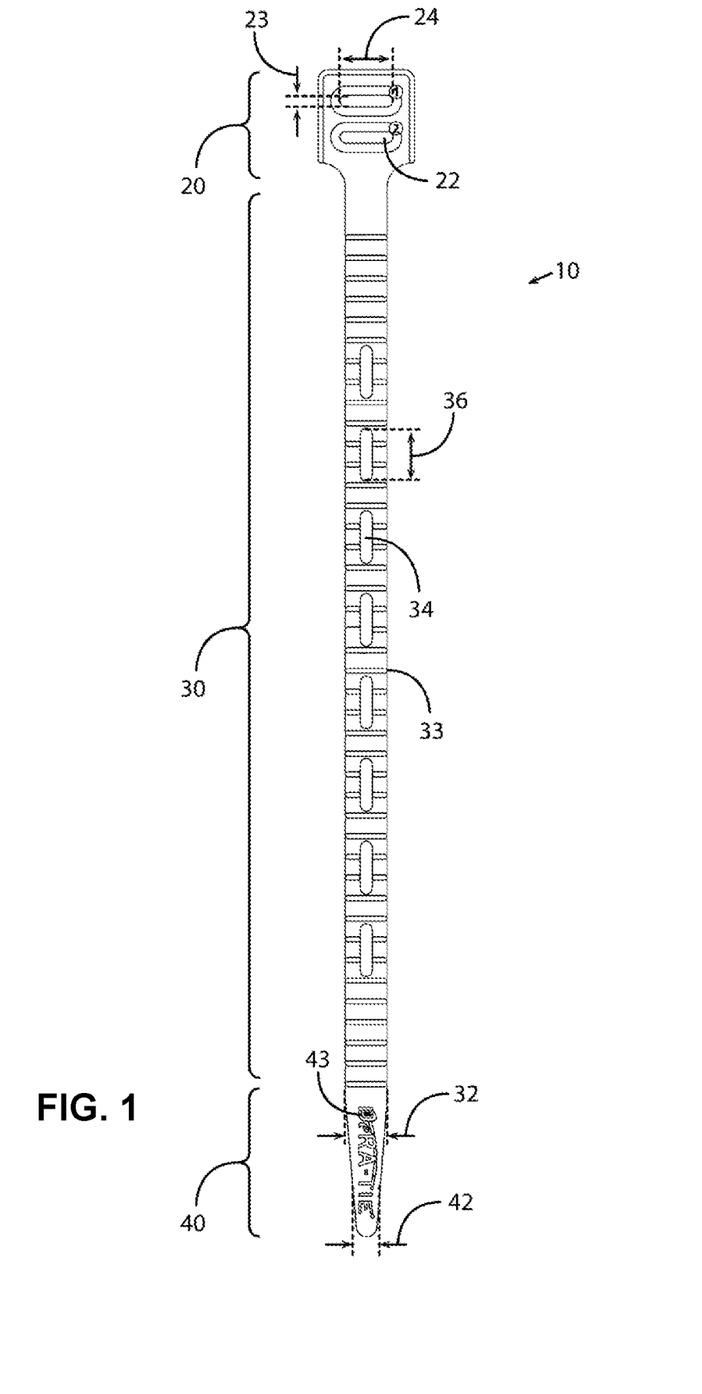
FIG. 1 and FIG. 2 are top elevation and perspective views of a first embodiment of the tie strap of the present invention, respectively.
Figure 2:
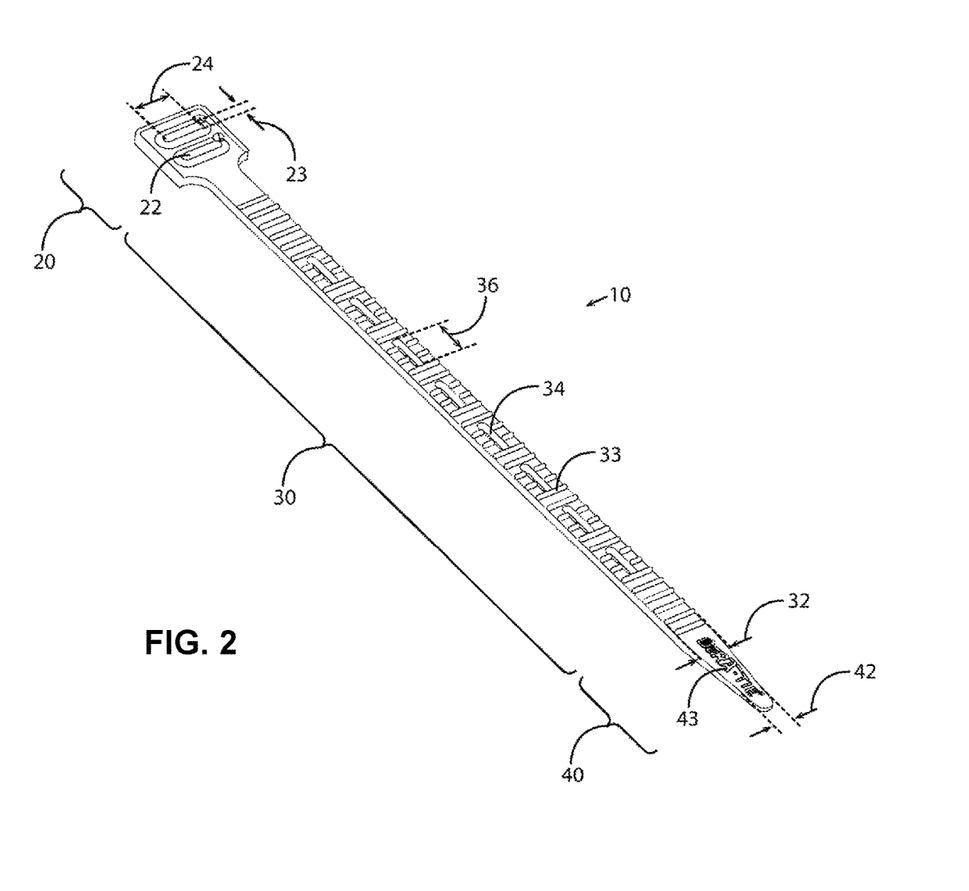

FIG. 1 and FIG. 2 show top elevation and perspective views of a first embodiment of the tie strap 10, respectively. On a first end is formed a head 20, on a medial region is formed a body 30, and on a second end is formed a tail 40. In alternate embodiments there may be multiple heads 20, bodies 30, and tails 40 as indicated in FIG. 9.

The head 20 comprises a plurality of similarly dimensioned head apertures 22 extending through the entire head thickness 21. Each head aperture 22 has a head aperture height 23 along its minor dimension and a head aperture width 24 along its major dimension. The head thickness 21 is defined immediately adjacent to the head apertures 22.

Although not illustrated, additional apertures of arbitrary size and shape may be present, for example a small circular aperture for hanging the tie strap 10 on a nail or pegboard. Furthermore, although head apertures 22 are illustrated as narrow slots with rounded ends, any aperture shape suitable for coupling with a body 30 may be used, as described herein. Finally, although a uniform head thickness 21 is illustrated, a varying thickness may be advantageous.

The body 30 generally comprises alternating large- and small-dimension regions formed by a plurality of ridge pairs 33a. Each ridge pair 33a comprises a first ridge 33 disposed on a first lateral surface 11a and a second ridge 33 disposed on a second lateral surface 11b immediately opposite each other, wherein both ridges 33 are oriented perpendicular to the longitudinal axis of the body 30, i.e. axially oriented. Although not illustrated, ridges 33 disposed on only one lateral surface 11 may be advantageous in some circumstances. Also, although only equally spaced ridge pairs 33a have been illustrated, it may be advantageous to space them unequally.

The body 30 has a body thickness 31 substantially equal to the head aperture height 23 and a body width 32 substantially equal to the head aperture width 24 to permit its insertion through a head aperture 22. The body thickness 31 is defined between adjacent ridges 33.

Finally, the tail 40 defines a tail thickness 41 that is smaller than the head aperture height 23 to enable easier insertion into a head aperture 22. Although unnecessary, the tail width 42 may be smaller than the head aperture width 24, or the tail 40 may have a generally tapered shape, to further simplify insertion of the tail 40 into a head aperture 22.

Figure 3:
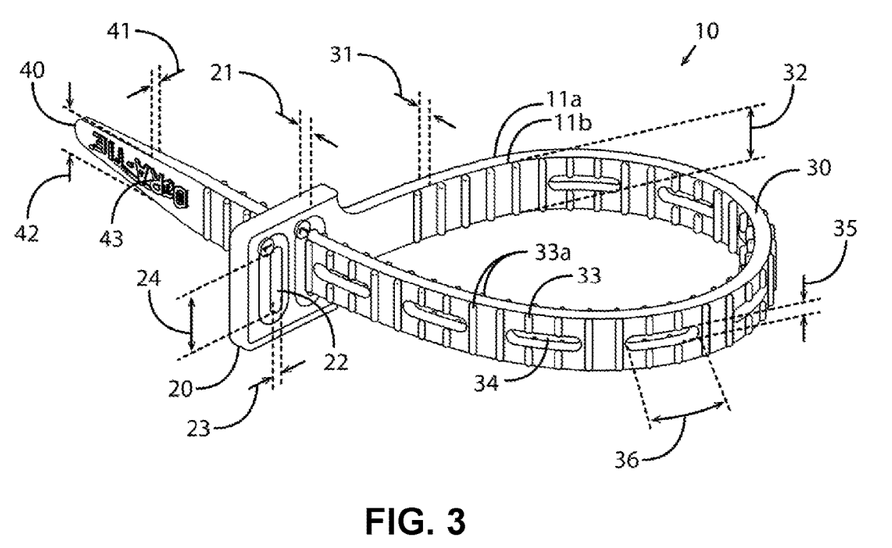
FIG. 3 is a perspective view of the tie strap body coupled with one of its head apertures.

FIG. 3 shows a perspective view of the tie strap 10 with the body 30 coupled to the head 20 through one of the head apertures 22. A user may couple the body 30 to the head 20 by: (1) inserting the tail 40 through a head aperture 22; (2) gripping the tail 40; and (3) pulling the tail 40 and subsequent body 30 until at least one ridge pair 33a has traversed through the head aperture 22. Shown on the tail 40 are a plurality of optional embossed elements 43 that facilitate easier gripping.

Figure 4:
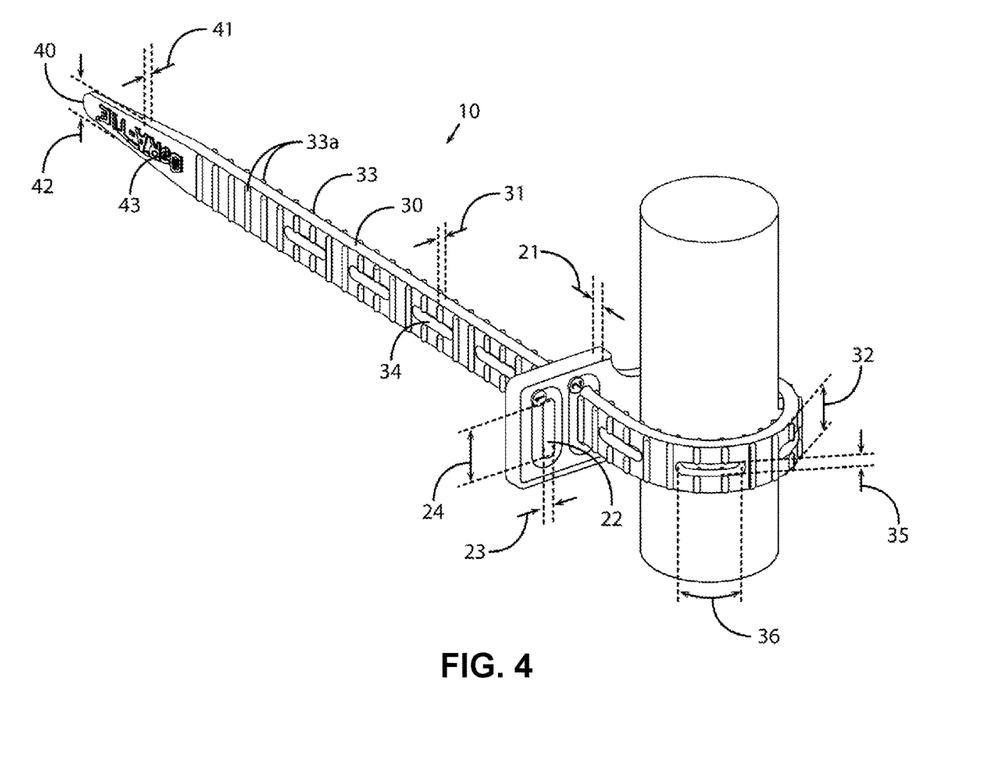
FIG. 4, FIG. 5, and FIG. 6 are perspective views of an example application of the tie strap secured to one or more objects by coupling to one or more head apertures.
Figure 5:
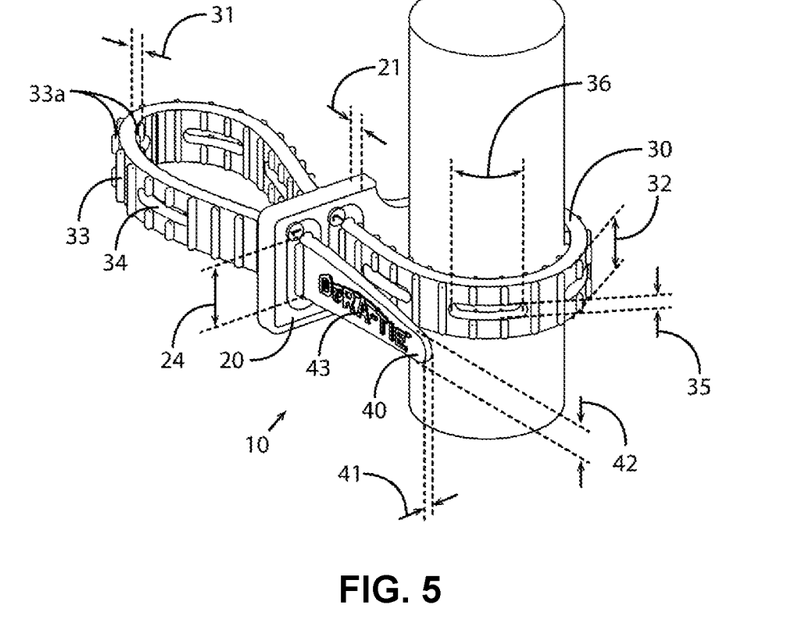
Figure 6:
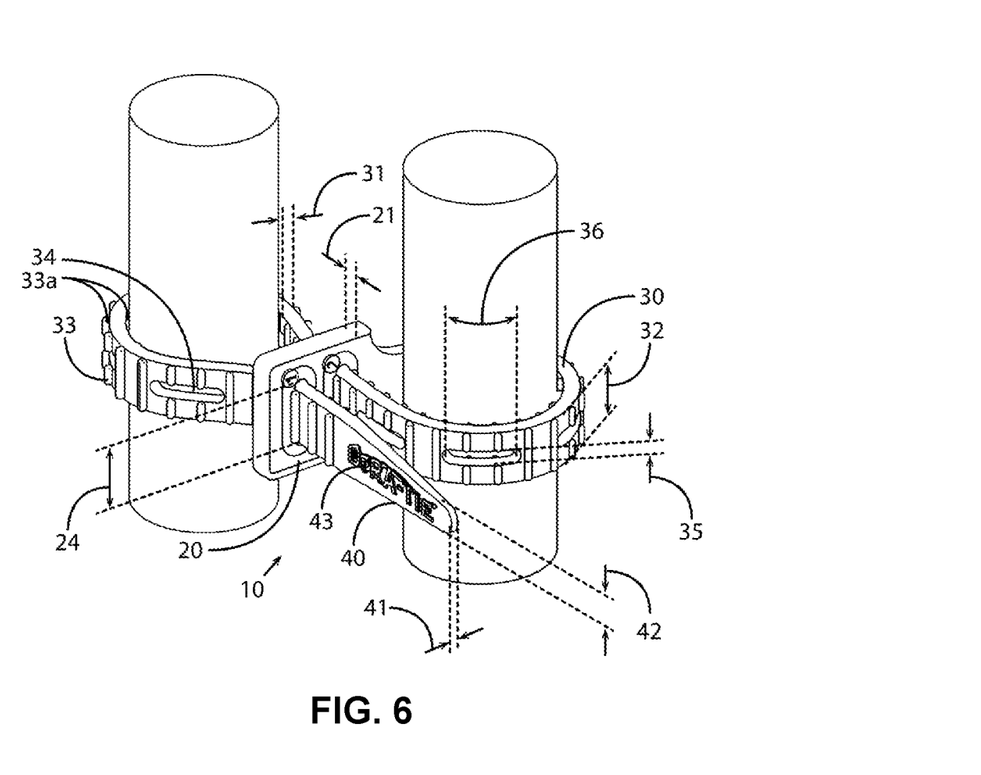

FIG. 4, FIG. 5, and FIG. 6 show an example application in which the tie strap 10 is secured to one or more objects by coupling a single body 30 to a plurality of head apertures 22. In the immediate example, the objects comprise a pair of vertically-oriented poles. FIG. 4 shows the body 30 wrapped around a first pole and inserted through a first head aperture 22 to achieve semi-permanent strapping thereto. In FIG. 5, the body 30 has been inserted through a second head aperture 22 in preparation for reusable strapping to a second pole. Finally, in FIG. 6, the body 30 has been pulled further through the second head aperture 22 to strap the second pole in place. This sequence is only one of many ways to strap multiple objects together using the tie strap 10, and is therefore not to limit the scope of the present invention.

Figure 7:
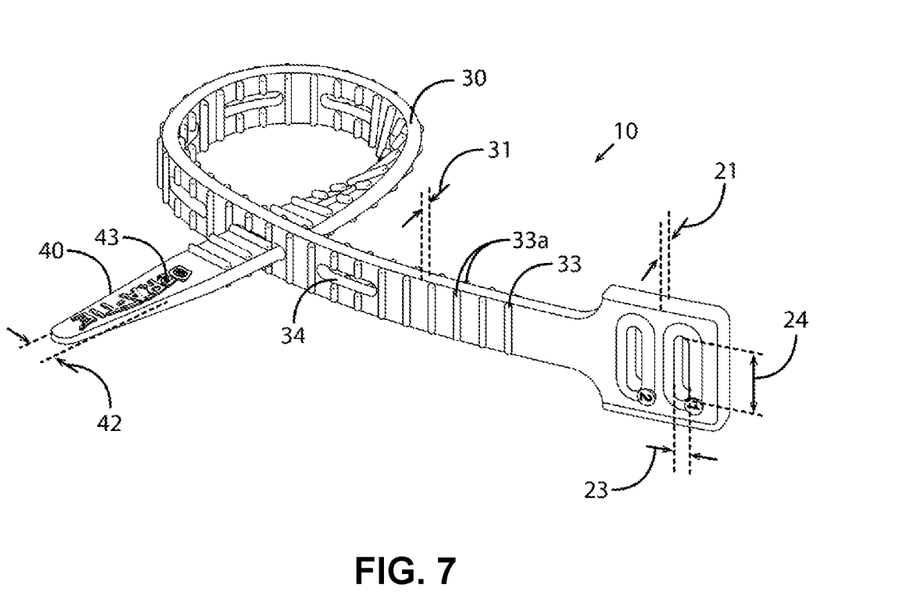
FIG. 7 is a perspective view of the tie strap body coupled with one of its body apertures.

As identified in FIG. 1 and FIG. 2, there may be optional body apertures 34 defined along the body 30. These body apertures 34 serve several purposes, including: (1) coupling with a body 30 to create additional strapping loops; (2) coupling with additional bodies 30 to create longer or variously configured tie straps 10; and (3) reducing the volume of material required for manufacturing. FIG. 7 shows a perspective view of the tie strap 10 with the body 30 coupled to one of the optional body apertures 34. The body apertures 34 are dimensioned similarly to the head apertures 22, each having a body aperture height 35 along its minor dimension and a body aperture width 36 along its major dimension.

Figure 8:
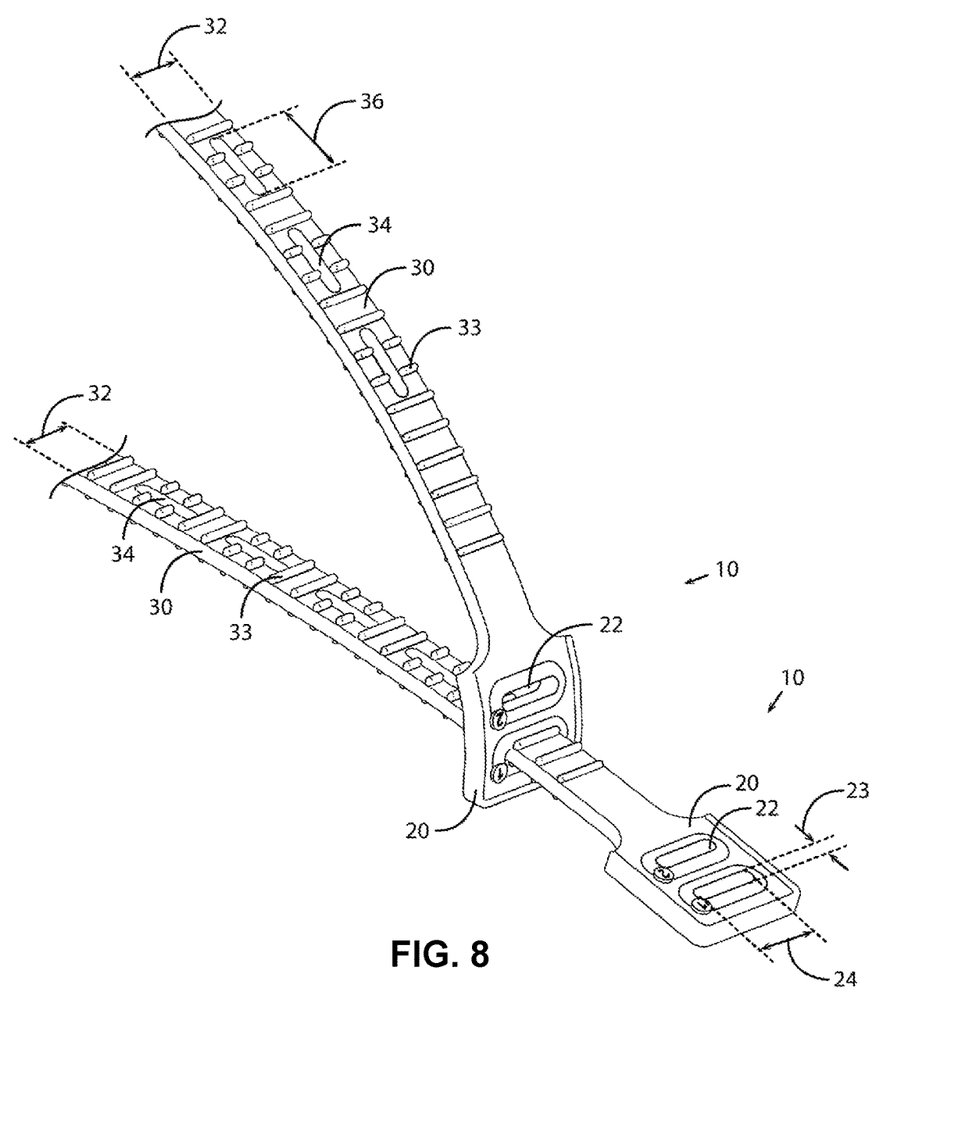
FIG. 8 is a partial perspective view of the tie strap body coupled with a head aperture of a second tie strap.

Although tie straps 10 may be manufactured in various lengths, widths, and thicknesses to suit particular applications, it should be appreciated that the plurality of head apertures 22 (and also optional body apertures 34) permit similar (compatible) tie straps 10 to be chained together to increase the effective strapping length. FIG. 8 illustrates an example in which the body 30 of a first tie strap 10 is coupled to the head 20 of a second tie strap 10.

Figure 9A:
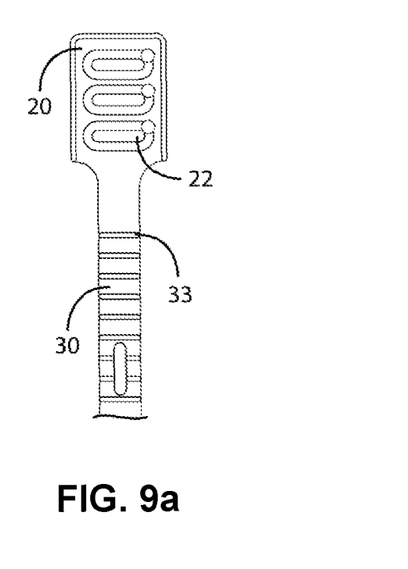
FIG. 9a through FIG. 9f are partial top elevation views of alternate embodiments.
Figure 9B:
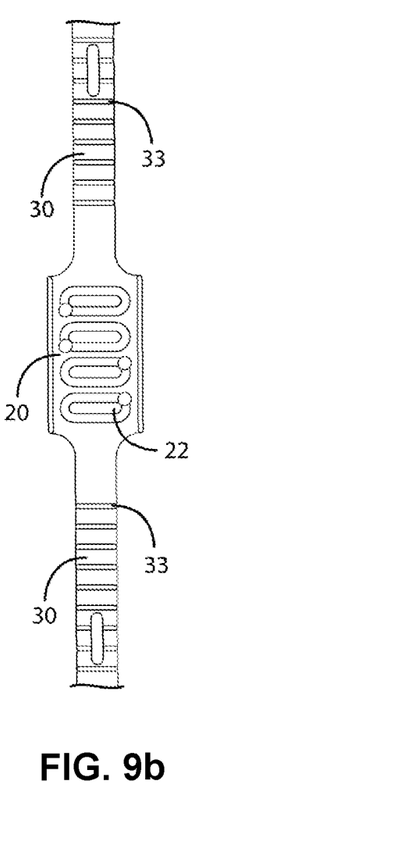
Figure 9C:
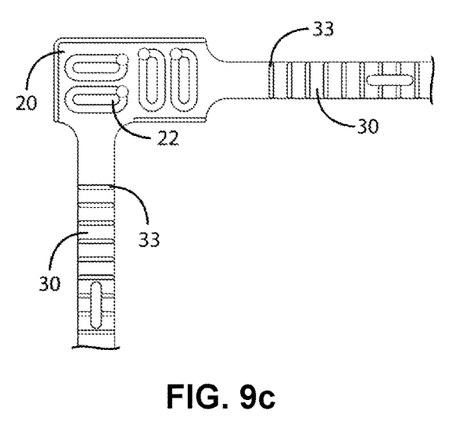
Figure 9D:
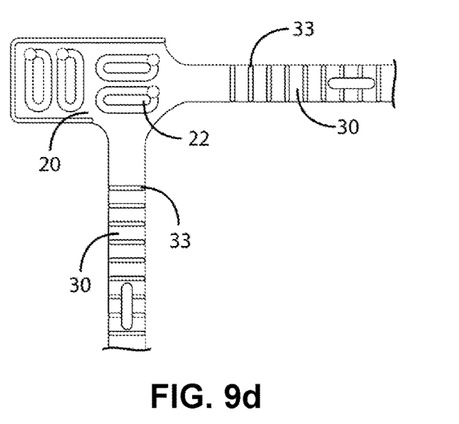
Figure 9E:
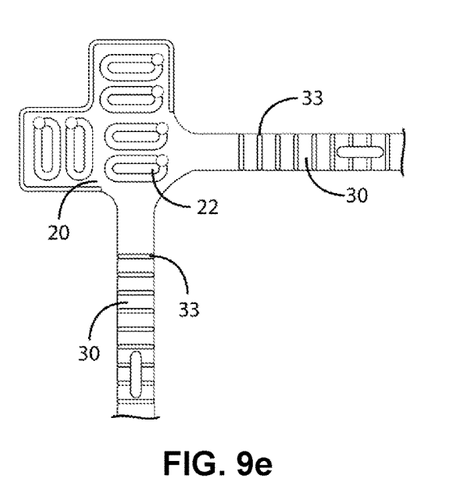
Figure 9F:
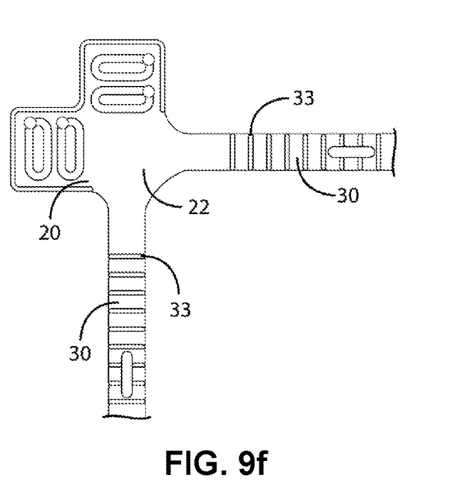

Many modifications, configurations, and features may be evident that do not depart from the spirit and scope of the present invention. For example, FIG. 9a illustrates a tie strap with three head apertures 22. FIG. 9b illustrates a tie strap resembling two tie straps 10 oriented 180 degrees from each other and joined at the head 20. FIG. 9c illustrates a tie strap resembling two tie straps 10 oriented 90 degrees from each other and joined at the head. FIG. 9d illustrates a tie strap resembling two tie straps 10 oriented 90 degrees from each other wherein the first tie strap 10 is inserted between the head apertures 22 and body 30 of the second tie strap 10. FIG. 9e illustrates a tie strap resembling two tie straps 10 oriented 90 degrees from each other wherein a region of the head 20 adjacent to the bodies 30 is increased in lateral dimensions to achieve equidistance between each pair of head apertures 22 and their corresponding bodies 30. FIG. 9f illustrates a tie strap similar to that shown in FIG. 9e but with an additional pair of head apertures 22 defined on the enlarged region of the head 20.

Although specific embodiments have been illustrated and described, it must be understood that the illustrated embodiments are exemplary, non-exhaustive, and should not limit the scope of the present invention as defined by the appended claims.

What is claimed is:

1. A substantially flat tie strap comprising:
   a first region defining a first thickness and having a plurality of first apertures each with a first aperture height and a first aperture width;
   at least one elongated second region defining a second thickness substantially equal to said first aperture height, a second width substantially equal to said first aperture width, and having a plurality of ridge pairs each comprising axially oriented ridges disposed on lateral surfaces immediately opposite each other, wherein the distance between adjacent pairs of said ridge pairs is substantially equal to said first thickness;
   at least one third elongated region defining a third thickness less than said first aperture height; and
   at least one longitudinally oriented second aperture disposed on said second region having a height substantially equal to said first aperture height and a width substantially equal to said first aperture width.

2. The tie strap of claim 1 further comprising at least one embossed element disposed on at least one lateral surface of said third region.

3. The tie strap of claim 2 comprised substantially of elastomeric material.

4. The tie strap of claim 1 comprised substantially of elastomeric material.

\* \* \* \* \*